US007812985B2

(12) United States Patent  
Nguyen et al.

(10) Patent No.: US 7,812,985 B2  
(45) Date of Patent: Oct. 12, 2010

(54) SYSTEM AND METHOD FOR REROUTING OF DOCUMENT PROCESSING JOBS

(75) Inventors: Truc Nguyen, San Diego, CA (US); William Su, Riverside, CA (US); Peter Tran, Garden Grove, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1013 days.

(21) Appl. No.: 11/450,750

(22) Filed: Jun. 9, 2006

(65) Prior Publication Data

US 2007/0285706 A1      Dec. 13, 2007

(51) Int. Cl.
    G06F 3/12      (2006.01)
    G06F 15/16     (2006.01)
(52) U.S. Cl. .................................. 358/1.15; 709/201
(58) Field of Classification Search .............. 358/1.15; 709/201, 202, 203
    See application file for complete search history.

(56) References Cited

U.S. PATENT DOCUMENTS 5,220,674 A * 6/1993 Morgan et al. ............. 709/223
2002/0143850 A1 * 10/2002 Caronni et al. ............. 709/201
2004/0160630 A1 * 8/2004 Iriyama et al. ............. 358/1.15
2004/0190042 A1 * 9/2004 Ferlitsch et al. ............ 358/1.15
2006/0028677 A1 * 2/2006 Isshiki et al. ............... 358/1.15
2007/0002368 A1 * 1/2007 Corona ....................... 358/1.15

* cited by examiner

Primary Examiner—Benny Q Tieu
Assistant Examiner—Eric A Rust
(74) Attorney, Agent, or Firm—SoCal IP Law Group LLP; Steven C. Sereboff; Jonathan Pearce

(57) ABSTRACT

A system and method for selective rerouting of document processing jobs is provided. A printer driver first converts electronic document data is into a device compatible format and assigned a unique document ID. The printer driver then determines a set of network devices, such as document processing devices, that are participating in the performance of received document processing jobs. The converted document data is then divided into portions and one or more portions are then sent to each of the participating network devices. One of the devices is then selected as the output device, whereupon the output device broadcasts/multicasts a request for processed data portions from each of the other network devices. The received portions are then recombined, and released for further processing in accordance with the received document processing job.

24 Claims, 4 Drawing Sheets

SYSTEM AND METHOD FOR REROUTING OF DOCUMENT PROCESSING JOBS

BACKGROUND OF THE INVENTION

This invention is directed to a system and method for rerouting of document processing jobs. More particularly, this invention is directed to a system and method which allows a user to perform document processing operations on any of the available document processing devices.

Typically, when a user desires to generate an electronic document, the user transmits the electronic document to a document processing device wherein the document is placed into a job queue. Most current document processing systems require the user to select a specific document processing device at the time of job submission. One issue with such systems is that the user must have the routing information for the designated device and know where the device is physically located. Another issue is if the document processing device is malfunctioning, the user may still be able to submit jobs to the device, but the device will not process any jobs until the device is again operational. Further, the selected device may be busy processing prior jobs. The user will then have to wait for the prior jobs to be processed before the user's job is processed. In order to avoid such problems, many current document processing systems will search the network for other document processing devices that can handle the jobs and inform the user of an available device or devices. The document processing system may then either automatically route the job to an available device or require the user to re-route the job. However, the available device may be physically located far from the user or the user may not know the location of the device. As such, there is a need for a document processing system and method which allows a user to submit a document processing job via the network, such that the job will be processed by selected available devices, thereby relieving the user of designating a specific device. There is also a need for a document processing system and method wherein the user may retrieve the job from any device associated with the system or network.

The subject application overcomes the above noted problems and provides a system and method for rerouting of document processing jobs.

SUMMARY OF THE INVENTION

In accordance with the subject application, there is provided a system and method for rerouting of document processing jobs.

Further, in accordance with the subject application, there is provided a system and method which allows a user to perform document processing operations on any of the available document processing devices.

Still further, in accordance with the subject application, there is provided a system and method which allows a user to submit a document processing job via the network, such that the job will be processed by selected available devices, thereby relieving the user of designating a specific device.

Still further, in accordance with the subject application, there is provided a system and method wherein a user may retrieve the job from any device associated with the system or network.

Still further, in accordance with the subject application, there is provided a system for rerouting of document processing jobs. The system includes means adapted for receiving electronic document data representative of a document processing job for an associated document processing device and means adapted for converting received electronic document data into page description data comprised of at least one selected page description language format. The system also includes means adapted for assigning unique document identification data to the document processing job. The system further includes determining means adapted for determining a set of available document processing devices available for processing of the document processing job and allocation means adapted for communicating at least a portion of the page description data to each of the set of available document processing devices for processing into page output data. The system also comprises means adapted for receiving page output data from each of the set of available document processing devices and means adapted for communicating page output data received from each of the set of available document processing devices to at least one selected document processing device for processing therefrom.

Still further, in accordance with the subject application, there is provided a method for rerouting electronic documents. Electronic document data representative of a document processing job for an associated document processing device is received and then converted into page description data comprised of at least one selected page description language format. A unique document identification data is then assigned to the document processing job. A set of available document processing devices available for processing of the document processing job is then determined and at least a portion of the page description data is communicated to each of the set available document processing devices for processing into page output data. The page output data is received from each of the set of available document processing devices and then is communicated to at least one selected document processing device for processing therefrom.

Preferably, the page output data is communicated to the at least one selected document processing device in accordance with the identification data.

In one embodiment, the system and method further include the ability to receive, from an associated user, selection data representative of the at least one selected document processing device.

In another embodiment, the system and method also include detecting at least one inoperative document processing device in the set of available document processing devices. The page description data targeted to the at least one inoperative document processing device is allocated to at least one other of the set of available document processing devices.

In yet another embodiment, the system and method also include the ability to selectively store page output data for selective completion of at least one additional document processing operation. Preferably, the stored page output data is selectively deleted upon at least one of expiration of a preselected time duration and receipt of a delete signal from an associated user.

Still other advantages, aspects and features of the subject application will become readily apparent to those skilled in the art from the following description wherein there is shown and described a preferred embodiment of this invention, simply by way of illustration of one of the best modes best suited to carry out the invention. As it will be realized, the invention is capable of other different embodiments and its several details are capable of modifications in various obvious aspects all without departing from the scope of the invention.

Accordingly, the drawing and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for rerouting of document processing jobs. In particular, according to the subject application, there is provided a system and method which allows a user to perform document processing operations on any of the available document processing devices. More particularly there is provided a system and method which allows a user to submit a document processing job via the network, such that the job will be processed by selected available devices, thereby relieving the user of designating a specific device. In accordance with one embodiment of the subject application, there is provided a system and method wherein a user is able to retrieve the job from any device associated with the system or network. As will be appreciated by those skilled in the art, a document processing job, as used herein, refers to any requested document processing operation to be performed on an associated document, image, or the like.

Figure 1:
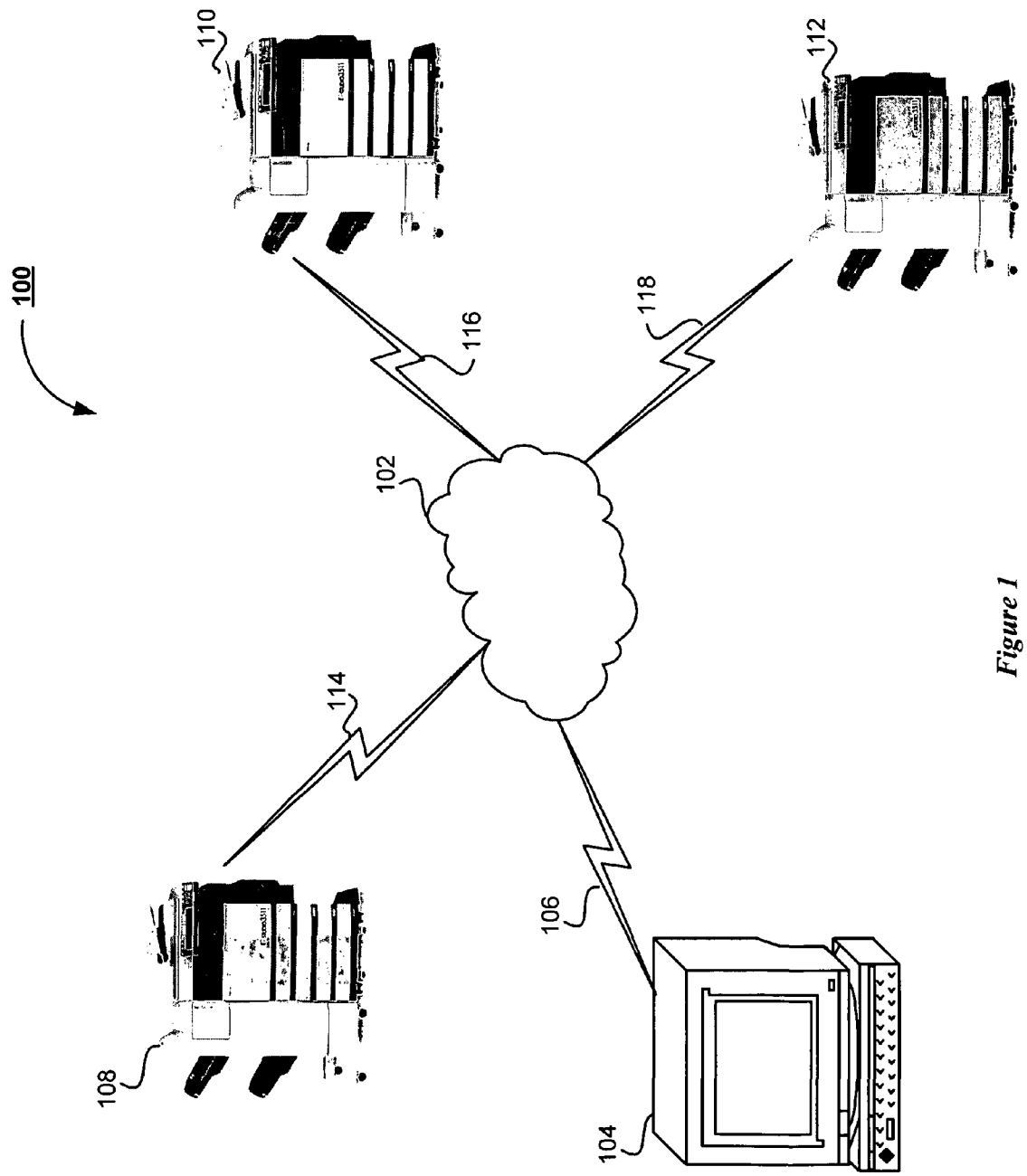
FIG. 1 which is an overall system diagram for the system for rerouting document processing jobs according to the subject application.

Turning now to FIG. 1, there is shown a system 100 in accordance with the subject application. As illustrated in FIG. 1, the system 100 includes a distributed computing environment, represented as a computer network 102. It will be appreciated that the computer network 102 is any distributed communications environment known in the art capable of allowing two or more electronic devices to exchange data. The skilled artisan will understand that the computer network 102 is any computer network, known in the art, including, for example and without limitation, a local area network, a wide area network, a personal area network, a virtual network, the Internet, or any combination thereof. In the preferred embodiment, the network 102 is comprised of physical layers and transport layers, as illustrated by a myriad of conventional data transport mechanisms, including, for example and without limitation, Ethernet, Token-Ring, 802.11(x), or other wire-based or wireless data communication mechanisms.

In the preferred embodiment of the subject application, the system 100 includes at least one client device 104 having an associated user. Preferably, the workstation 104 is communicatively coupled to the computer network 102 via a suitable communications link 106. The functioning of the client device 104 will better be understood in conjunction with the block diagram illustrated in FIG. 2, explained in greater detail below. It will be appreciated by those skilled in the art that the client device 104 is depicted in FIG. 1 as a computer workstation for illustration purposes only. As the skilled artisan will understand, the workstation 104 shown in FIG. 1 is representative of any personal computing device known in the art, including, for example and without limitation, a personal computer, a laptop computer, a personal data assistant, a web-enabled cellular telephone, a smart phone, or other web-enabled electronic device suitably capable of generating and/or transmitting electronic document data to a multifunctional peripheral device.

Communication between the workstation 104 and the computer network 102 is advantageously accomplished via the communications link 106. The communications link 106 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. In the preferred embodiment, the workstation 104 is suitably adapted to generate an electronic document using any document or image generating application known in the art.

As illustrated in FIG. 1, the system 100 includes a plurality of document processing devices, represented in FIG. 1 as the multifunction peripheral device 108, the multifunction peripheral device 110, and the multifunction peripheral device 112. It will be appreciated by those skilled in the art the document processing devices 108, 110, and 112 are advantageously represented in FIG. 1 as multifunction peripheral devices, suitably adapted to provide a variety of document processing services, such as, for example and without limitation, electronic mail, scanning, copying, facsimile, document management, printing, and the like. Suitable commercially available document rendering devices include, but are not limited to, the Toshiba e-Studio Series Controller. In one embodiment, the document processing devices 108, 110, and 112 are suitably equipped to receive a plurality of portable storage media, including without limitation, Firewire drive, USB drive, SD, MMC, XD, Compact Flash, Memory Stick, and the like. In the preferred embodiment of the subject application, each document processing device 108, 110, and 112, further include an associated user-interface, such as a touch-screen interface, LCD display, or the like, via which an associated user is able to interact directly with the respective document processing device 108, 110, or 112.

Each of the document processing devices 108, 110, and 112 are in data communication with the computer network 102 via suitable communication links 114, 116, and 118, respectively. In accordance with the preferred embodiment of the subject application, suitable communications links 114, 116, and 118 employed in accordance with the subject application include, WiMax, 802.11a, 802.11b, 802.11g, 802.11(x), Bluetooth, the public switched telephone network, a proprietary communications network, infrared, optical, or any other suitable wired or wireless data transmission communications known in the art. In a preferred embodiment, the document processing devices 108, 110, and 112 are advantageously registered as participating in the document processing operations in accordance with the subject application.

Figure 2:
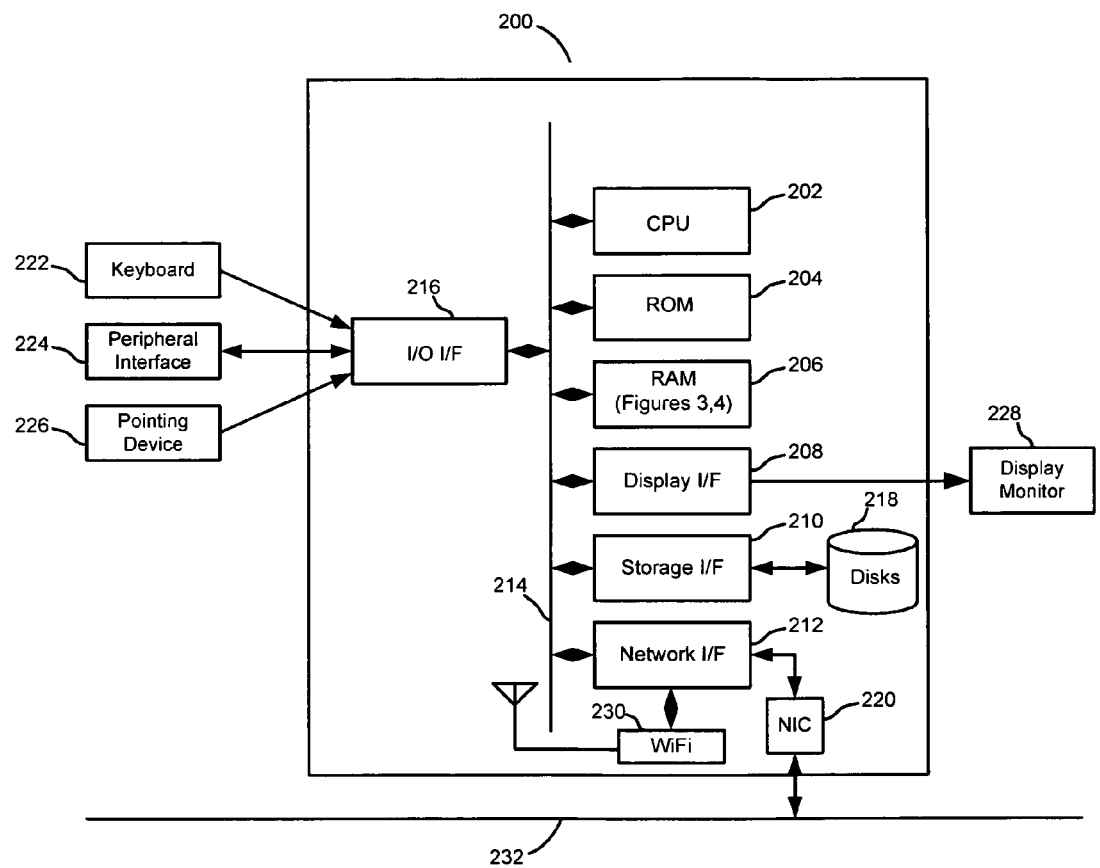
FIG. 2 is a block diagram illustrating workstation for use in the system for rerouting document processing jobs according to the subject application.

Turning now to FIG. 2, illustrated is a hardware diagram of a suitable workstation 200 for use in connection with the subject system. A suitable workstation includes a processor unit 202 which is advantageously placed in data communication with read only memory 204, suitably non-volatile read only memory, volatile read only memory or a combination thereof, random access memory 206, display interface 208, storage interface 210, and network interface 212. In a preferred embodiment, interface to the foregoing modules is suitably accomplished via a bus 214.

Read only memory 204 suitably includes firmware, such as static data or fixed instructions, such as BIOS, system functions, configuration data, and other routines used for operation of the workstation 200 via CPU 202.

Random access memory 206 provides a storage area for data and instructions associated with applications and data handling accomplished by processor 202.

Display interface 208 receives data or instructions from other components on bus 214, which data is specific to generating a display to facilitate a user interface. Display interface 208 suitably provides output to a display terminal 226, suitably a video display device such as a monitor, LCD, plasma, or any other suitable visual output device as will be appreciated by one of ordinary skill in the art.

Storage interface 210 suitably provides a mechanism for non-volatile, bulk or long term storage of data or instructions in the workstation 200. Storage interface 210 suitably uses a storage mechanism, such as storage 218, suitably comprised of a disk, tape, CD, DVD, or other relatively higher capacity addressable or serial storage medium.

Network interface 212 suitably communicates to at least one other network interface, shown as network interface 220, such as a network interface card. It will be appreciated that by one or ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by on of ordinary skill in the art.

An input/output interface 216 in data communication with bus 214 is suitably connected with an input device 222, such as a keyboard or the like. Input/output interface 216 also suitably provides data output to a peripheral interface 224, such as a USB, universal serial bus output, SCSI, Firewire (IEEE 1394) output, or any other interface as may be appropriate for a selected application. Finally, input/output interface 216 is suitably in data communication with a pointing device interface 228 for connection with devices, such as a mouse, light pen, touch screen, or the like.

In operation, according to the preferred embodiment of the subject application, a user associated with the workstation 104 generates an electronic document, or selects an electronic document for processing on a selected document processing device. As will be appreciated by those skilled in the art, the electronic document is any image or document data, as is known in the art, which the associated user desires to have processed by the document processing device. The associated user initiates a document processing request, corresponding to the desired document processing operation to be performed on the selected electronic document. A printer driver, or other software application known in the art, located on the workstation 104, is then initiated, thereby implementing one aspect of the subject application. Preferably, the printer driver converts the electronic document into a page description language, such as the Postscript® language by Adobe Systems, Incorporated, or Printer Control Language (PCL) by Hewlett-Packard Corporation, and assigns the user a unique document ID corresponding to the converted electronic document. The skilled artisan will appreciate that any suitable device compatible format is capable of being used by the printer driver to generate suitable page description data.

Following conversion of the electronic document and assignment of the unique document ID, the printer driver searches the network 102 for those document processing devices 108, 110, and 112, or a subnet of document processing devices, participating in accordance with the subject application. As used herein, the term participating refers to those document processing devices capable of receiving a portion of a document processing request, or retrieving electronic document data from a client device in accordance with the methods described hereinafter. The printer driver then divides, i.e., breaks down, the converted document data into small portions, or chunks of data. The skilled artisan will appreciate that any suitable methods for parsing and dividing the document data as are known in the art, such as packetization, are capable of being employed in accordance with the subject application. The printer driver then sends groups of these chunks to different document processing devices 108, 110, and 112, on the network 102, so as to balance the load between various document processing devices.

For example, when two copies of a document are to be output and three document processing devices 108, 110, and 112, are available, the printer driver divides the electronic document into three portions. Each portion is numbered and sets of two portions are sent to each document processing device. Thus, document processing device 108 receives portions one and two, document processing device 110 receives portions two and three, and document processing device 112 receives portions three and one. The portions are thereby overlapped resulting in the allocation of two complete sets of documents among the participating document processing devices 108, 110, and 112.

The user associated with the electronic document then determines which document processing device the user desires to perform the document processing operation. This selection is advantageously made by releasing the document for processing at the user interface associated with the selected document processing device. For example, when the user desires that the document processing device 108 perform the selected operation, the user inputs the unique document ID at the user interface associated with the document processing device 108. The selected document processing device 108 then transmits a message via the computer network 102 requesting data corresponding to the document associated with the unique document ID. As will be appreciated by those skilled in the art, the message is capable of being broadcasted, multi-casted, or any suitable transmission form corresponding thereto. The participating document processing devices 110 and 112 then transmit those portions previously received from the printer driver to the requesting document processing device 108.

The requesting document processing device 108 then recombines those portions, or chunks, so as to recreate the page description data associated with the converted electronic document. After the selected document processing operation has been performed, the recombined page description data is automatically expired and deleted upon the elapse of a predetermined time interval. In the event that the user has not selected a document processing device within a predetermined time interval, the portions, or chunks, are deleted from the participating document processing devices 108, 110, and 112. It will be appreciated by those skilled in the art that when one of the document processing devices 108, 110, or 112 is unavailable, for mechanical failure, or the like, the overlapping instituted in accordance with the subject application allows for completion of the job by the remaining participating document processing devices.

In an alternate embodiment of the subject application, a user associated with the workstation 104 generates an electronic document, or selects an electronic document for processing on a selected document processing device. As will be appreciated by those skilled in the art, the electronic document is any image or document data, as is known in the art, which the associated user desires to have processed by the document processing device. The associated user initiates a document processing request, corresponding to the desired document processing operation to be performed on the selected electronic document. A printer driver, on the workstation 104, or other software application known in the art, is then initiated, thereby implementing one aspect of the subject application. Preferably, the printer driver converts the electronic document into a page description language, such as Postscript® or PCL, and assigns the user a unique document ID corresponding to the converted electronic document. The skilled artisan will appreciate that any suitable device compatible format is capable of being used by the printer driver to generate suitable page description data.

Following conversion of the electronic document and assignment of the unique document ID, the printer driver stores the converted electronic document in a temporary storage location associated with the workstation 104. The driver then searches the network 102 for those document processing devices 108, 110, and 112, or a subnet of document processing devices, participating in accordance with the subject application. The printer driver then transmits, to each participating document processing device 108, 110, and 112, a special sequence of characters, denoting the location of the converted electronic document, i.e., the page description data, and the assigned unique document ID.

The user associated with the electronic document then determines which document processing device the user desires to perform the document processing operation. This selection is advantageously made by releasing the document for processing at the user interface associated with the selected document processing device. For example, when the user desires that the document processing device 110 perform the selected operation, the user inputs the unique document ID at the user interface associated with the document processing device 110. The selected document processing device 110 then uses the data contained within the special sequence of characters to identify the location of the converted electronic document to be processed and retrieves the document from the temporary storage associated with the workstation 104. The selected document processing device 110 then performs the selected document processing operation and the user is able to delete the converted document data from the temporary storage location.

Figure 3:
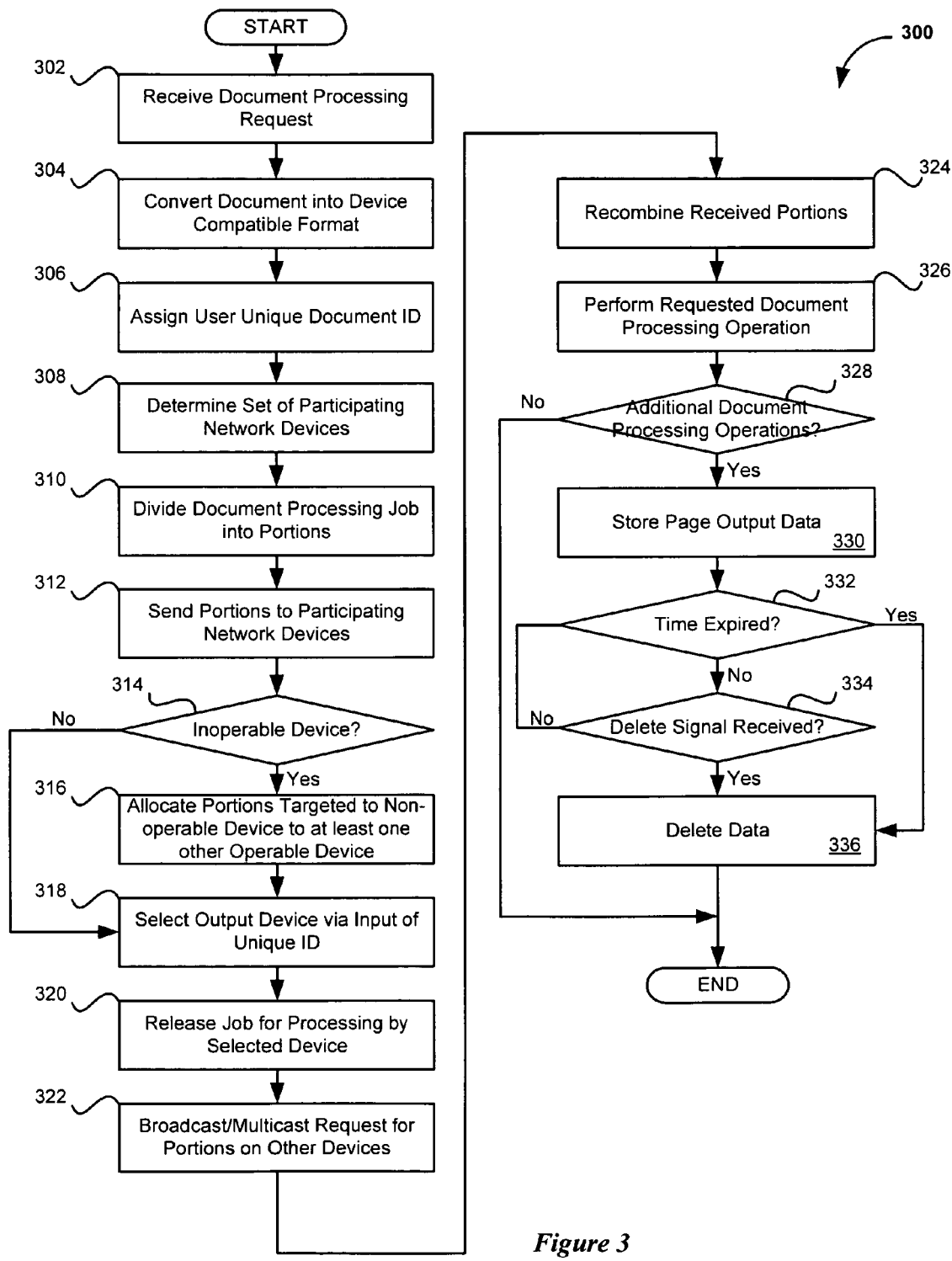
FIG. 3 is a flowchart illustrating one method for rerouting document processing jobs according to the subject application.
Figure 4:
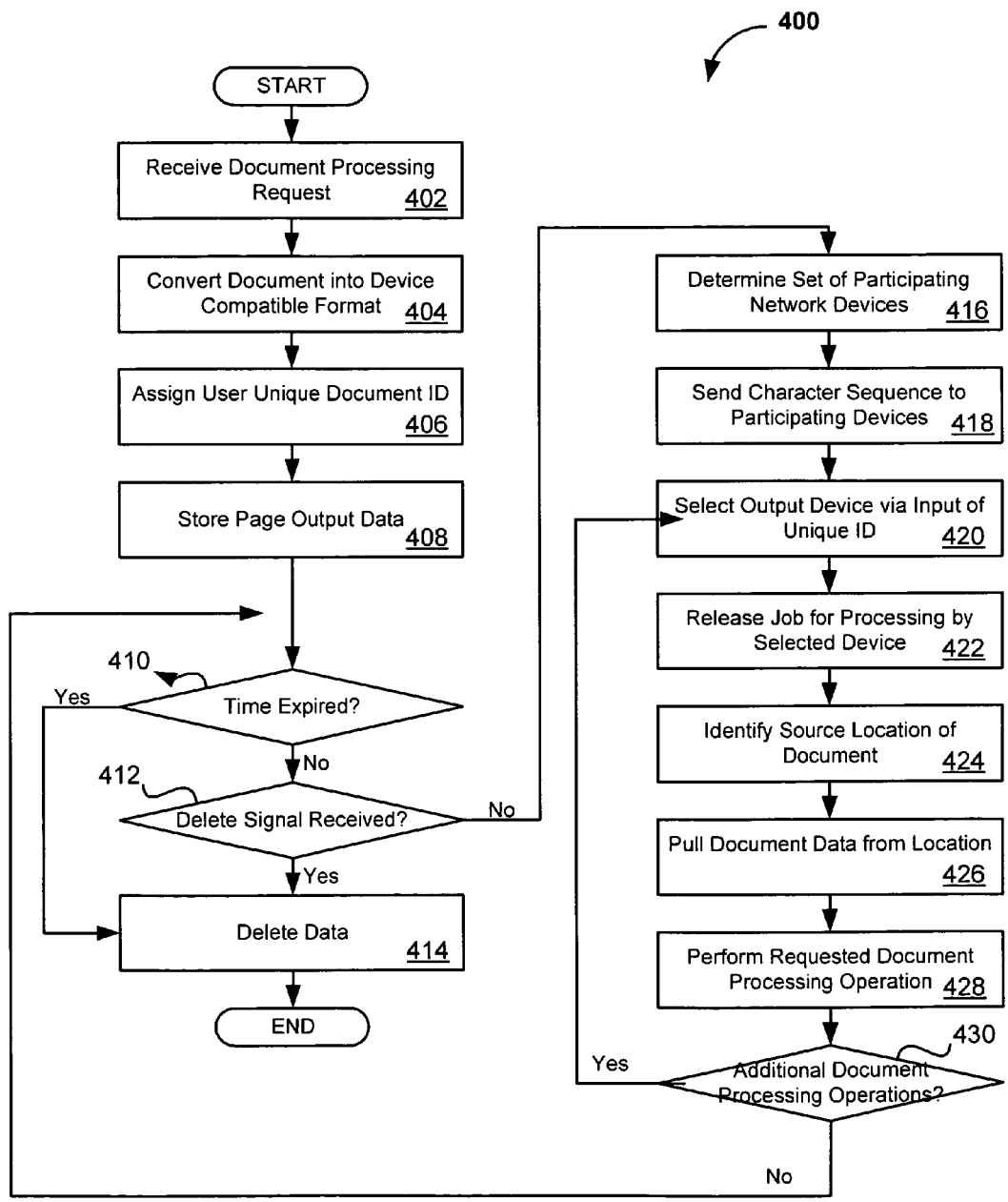
FIG. 4 is a flowchart illustrating another method for rerouting document processing jobs according to the subject application.

The foregoing description of the preferred embodiment of the system 100 illustrated in FIGS. 1 and 2, in accordance with the subject application will better be understood by those skilled in the art when interpreted in conjunction with the methodologies illustrated in FIGS. 3 and 4. Turning now to FIG. 3, there is shown a flowchart 300 depicting a method for routing electronic documents in accordance with the subject application. Beginning at step 302, a printer driver associated with a workstation 104 receives a document processing request from an associated user. It will be understood by those skilled in the art that the receipt of the document processing request advantageously originates within a word processing program, an image processing program, or the like, operating on the workstation 104. In addition, the user is able to select a file for output from a directory via any suitable means known in the art. Irrespective of the manner in which the printer driver receives the document processing request, the printer driver converts the electronic document associated with the document processing request into a device compatible format at step 304. As previously discussed, suitably acceptable device compatible formats include a page description language in Adobe Postscript® format, PCL format, or any other page description language known in the art. The printer driver then assigns a unique document ID to the user associated with the converted electronic document data at step 306.

At step 308, the printer driver determines those document processing devices 108, 110, and 112, resident on the computer network 102 and participating in the document processing methodology set forth in accordance with the subject application. Once the set of document processing devices 108, 110, and 112 has been determined, flow proceeds to step 310, whereupon the printer driver divides the document processing job into a plurality of portions. It will be understood by those skilled in the art that the number of portions into which the document processing job is divided is dependent upon a variety of factors, including, for example and without limitation, the size of the job, the type of document processing operation, the relative priority of the job, the processing parameters, or the like. The portions generated by the printer driver are then sent to the participating document processing devices 108, 110, and 112 at step 312. It will be appreciated by those skilled in the art that the number of portions sent to each document processing device 108, 110, and 112 is determined based upon a variety of factors, including, for example and without limitation, the size of the document processing job, the type of document, the number of copies to be output, the processing parameters selected by the user, and the like.

A determination is then made at step 314 whether one of the participating document processing devices 108, 110, or 112 is non-operable, that is, whether or not one of the participating devices is not currently in operation or is unable to perform the selected document processing operation. A positive determination at step 314 prompts the printer driver, at step 316, to allocate those portions targeted to the non-operable device to at least one of the other operable devices. For example, when device 110 is not operable, the portions targeted to device 110 are capable of being sent instead to device 108, device 112, or divided between both devices 108 and 112. Flow then proceeds to step 318, whereupon the associated user selects one of the participating document processing devices 108 or 112 (in accordance with the preceding example) to output the document processing job. A negative determination at step 314, i.e., all devices 108, 110, and 112 are operable, prompts flow to proceed to step 318, whereafter the associated user selects one of the devices 108, 110, or 112 to output the document processing job. In accordance with the preferred embodiment of the subject application, selection of the output device is accomplished by the user inputting the assigned unique document ID at the user-interface associated with the selected document processing device. The skilled artisan will appreciate that other methods of selecting the output device are equally capable of being implemented without departing from the scope of the subject application.

At step 320 the associated user, via the user-interface associated with the selected document processing device, releases the document processing job for output via any suitable means known in the art. For example, the associated user selects document processing device 108 as the output device by inputting the unique document ID at its associated user-interface. At step 322, the selected output device, i.e., device 108, broadcasts/multicasts a request for all portions on other devices 110 and 112 corresponding to the input unique document ID. These portions are then received from the devices 110 and 112 by the output device 108 and recombined at step 324 to form the converted electronic document data, wherein the recombined data corresponds to the page description data associated with the original electronic document. The selected document processing operation is then performed by the output device 108 at step 326.

A determination is then made at step 328 whether additional document processing operations, with respect to the recombined document, remain. When no further document processing operations on the document remain for processing, the operation terminates. When further operations are noted by the document processing device 108, flow proceeds to step 330, whereupon the page output data, i.e., the recombined document in the device compatible format, is stored in associated memory. A determination is then made at step 332 whether a predetermined time limit has expired. When the time limit has expired, flow proceeds to step 336, whereupon the data is deleted and the operation terminates. When the time has not elapsed, flow proceeds to step 334, whereupon a determination is made whether a delete signal has been received indicating that the additional document processing operation has been performed, or that the user does not require further operations. When a positive determination is made at step 334, flow progresses to step 336, whereupon the data is deleted. When no such deletion signal has been received, flow returns to step 332 to await the elapse of the predetermined period of time or the receipt of a deletion signal.

Referring now to FIG. 4, there is shown a flowchart 400 illustrating an alternative embodiment of the electronic document routing methodology in accordance with the subject application. Beginning at step 402, a printer driver, resident on the workstation 104, receives a document processing request from an associated user. Preferably, the document processing request includes data representative of an electronic document, including, but not limited to image data, document data, spreadsheet data, or the like, as well as a selected document processing operation to be performed on the electronic document. At step 404, the printer driver converts the electronic document data into a device compatible format, i.e., page description data in a suitable page description language format. As previously mentioned, suitable language formats include, for example and without limitation, the Postscripts format, the PCL format, and the like. A unique document ID is then assigned to the user corresponding to the converted document data at step 406. This converted document data, or page description data, is then stored, at step 408, in a memory associated with workstation 104.

A determination is then made at step 410 whether a predetermined period of time has elapsed. When this time limit has expired, the converted document data is deleted from the memory associated with the workstation 104 at step 414, whereupon the operation terminates. When the predetermined period of time has not expired, flow proceeds to step 412, whereupon a determination is made whether a deletion signal has been received. When such a signal has been received, the converted document data is deleted from storage at step 414 and the operation terminates. When no such deletion signal has been received, flow proceeds to step 416, whereupon the printer driver ascertains the set of participating network devices 108, 110, and 112.

Once the printer driver of the workstation 104 has determined those participating devices 108, 110, and 112, flow proceeds to step 418, whereupon the driver transmits a character sequence designating the location and unique document ID associated with the document processing request to each of the participating devices 108, 110, and 112. As will be appreciated by those skilled in the art, the character sequence includes, for example and without limitation, the location data corresponding to the location of the converted document data in the associated memory, data representing the selected document processing operation, data representing the unique document ID, and the like. The skilled artisan will further appreciate that the term character sequence is for illustration purposes only, and the data described above is capable of being included within a data packet transmitted from the workstation 104 to each of the participating document processing devices 108, 110, and 112, via the computer network 102.

Once all participating document processing devices 108, 110, and 112 have received the character sequence, flow proceeds to the selection of the output device by the associated user at step 420. As will be understood by those skilled in the art, the selection of the desired output device, e.g., device 110, is accomplished by the user inputting the unique document ID corresponding to the document processing request at the user-interface associated with the selected output device 110. The user then releases, via any suitable means, the electronic document for processing by the selected output device 110 via any suitable means known in the art. Preferably, the user selects a release option displayed on the associated user-interface. At step 424, the selected output device 110 identifies the source location of the released document, i.e., the location in workstation 104 memory where the converted document data is stored. The device 110 then pulls, from the workstation 104 via the computer network 102, the converted electronic document data at step 426 and performs the selected document processing operation at step 428.

A determination is then made at step 430 whether additional document processing operations are to be performed on the converted document data. When additional operations are to be performed, flow returns to step 420, whereupon the user selects a desired document processing device 108, 110, or 112 to perform the operation. Operations continue thereafter as explained above with respect to steps 422-430. When no additional operations are to be performed, flow returns to step 410, whereupon a determination is made as to the expiration of a predetermined period of storage time. When this time limit has been reached, the converted electronic document data is deleted from the memory of workstation 104 at step 414, following which the operation terminates. When this time limit has not yet expired, flow proceeds from step 410 to step 412, whereupon a determination is made whether the workstation 104 has received a deletion signal. When the deletion signal has not been received, flow progresses to step 416 in accordance with the method described above. When a deletion signal has been received by the workstation 104, the converted document data is deleted from the associated memory at step 414 and the operation of the method, as set forth in FIG. 4, terminates.

The invention extends to computer programs in the form of source code, object code, code intermediate sources and partially compiled object code, or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system for selective rerouting of document processing jobs comprising:
   a set of available document processing devices;
   means adapted for receiving electronic document data representative of a document processing job for an associated document processing device;
   means adapted for converting received electronic document data into page description data comprised of at least one selected page description language format;
   means adapted for assigning unique document identification data to the document processing job;
   determining means adapted for determining the set of available document processing devices available for processing of the document processing job;
   allocation means adapted for communicating a portion of the page description data to each of the set of available document processing devices;
   receiving means adapted for receiving, from an associated user, the unique document identification data corresponding to the document processing job at a selected one of the set of available document processing devices,
   means adapted for communicating a request, inclusive of the unique document identification data, for all portions of the page description data to each of the set of available document processing devices from the selected one of the set of devices responsive to receipt of the unique document identification data;
   means adapted for receiving page output data from each of the set of available document processing devices responsive to the communicated request in accordance with the unique document identification data;
   means adapted for recombining, into the page description data, page output data received from each of the set of available document processing devices at the selected document processing device for processing at the selected document processing device after receipt; and
   means adapted for processing the recombined page description data at the selected document processing device so as to generate page output data therefrom.

2. The system for selective rerouting of document processing jobs of claim 1 further comprising means adapted for receiving, from an associated user, selection data representative of the selected document processing device.

3. The system for selective rerouting of document processing jobs of claim 1 further comprising:
   means adapted for detecting at least one inoperative document processing device in the set of available document processing devices; and
   wherein the allocation means includes means for allocating page description data targeted to the at least one inoperative document processing device to at least one other of the set of available document processing devices.

4. The system for selective rerouting of document processing jobs of claim 1 wherein each of the set of available document processing devices includes means adapted for recombining page output data at the selected document processing device in accordance with the unique document identification data.

5. The system for selective rerouting of document processing jobs of claim 1 further comprising means adapted for selectively storing page output data for selective completion of at least one additional document processing operation.

6. The system for selective rerouting of document processing jobs of claim 5 further comprising means adapted for selectively deleting stored page output data upon at least one of expiration of a pre-selected time duration and receipt of a delete signal from an associated user.

7. A method for selective rerouting of document processing jobs comprising the steps of:
   receiving electronic document data representative of a document processing job for an associated document processing device;
   converting received electronic document data into page description data comprised of at least one selected page description language format;
   assigning unique document identification data to the document processing job;
   determining a set of available document processing devices available for processing of the document processing job;
   communicating a portion of the page description data to each of the set available document processing devices;
   receiving, from an associated user, the unique document identification data corresponding to the document processing job at a selected one of the set of available document processing devices,
   communicating a request, inclusive of the unique document identification data, for all portions of the page description data to each of the set of available document processing devices from the selected one of the set of devices responsive to receipt of the unique document identification data;
   receiving page output data from each of the set of available document processing devices responsive to the communicated request in accordance with the unique document identification data;
   recombining, into the page description data, page output data received from each of the set of available document processing devices at the selected one document processing device for processing at the selected document processing device after receipt; and
   processing the recombined page description data at the selected document processing device so as to generate page output data therefrom.

8. The method for selective rerouting of document processing jobs of claim 7 further comprising the step of receiving, from an associated user, selection data representative of the selected document processing device.

9. The method for selective rerouting of document processing jobs of claim 7 further comprising the steps of:
   detecting at least one inoperative document processing device in the set of available document processing devices; and allocating page description data targeted to the at least one inoperative document processing device to at least one other of the set of available document processing devices.

10. The method for selective rerouting of document processing jobs of claim 7 wherein the step of recombining page output data at the selected document processing device is in accordance with the unique document identification data.

11. The method for selective rerouting of document processing jobs of claim 7 further comprising the step of selectively storing page output data for selective completion of at least one additional document processing operation.

12. The method for selective rerouting of document processing jobs of claim 11 further comprising the step of selectively deleting stored page output data upon at least one of expiration of a pre-selected time duration and receipt of a delete signal from an associated user.

13. A computer-implemented method for selective rerouting of document processing jobs comprising the steps of:
  receiving electronic document data representative of a document processing job for an associated document processing device;
  converting received electronic document data into page description data comprised of at least one selected page description language format;
  assigning unique document identification data to the document processing job;
  determining a set of available document processing devices available for processing of the document processing job;
  communicating a portion of the page description data to each of the set available document processing devices;
  receiving, from an associated user, the unique document identification data corresponding to the document processing job at a selected one of the set of available document processing devices,
  communicating a request, inclusive of the unique document identification data, for all portions of the page description data to each of the set of available document processing devices from the selected one of the set of devices responsive to receipt of the unique document identification data;
  receiving page output data from each of the set of available document processing devices responsive to the communicated request in accordance with the unique document identification data;
  recombining, into the page description data, page output data received from each of the set of available document processing devices at the selected one document processing device for processing at the selected document processing device after receipt; and
  processing the recombined page description data at the selected document processing device so as to generate page output data therefrom.

14. The computer-implemented method for selective rerouting of document processing jobs of claim 13 further comprising the step of receiving, from an associated user, selection data representative of the selected document processing device.

15. The computer-implemented method for selective rerouting of document processing jobs of claim 13 further comprising the steps of:
  detecting at least one inoperative document processing device in the set of available document processing devices; and
  allocating page description data targeted to the at least one inoperative document processing device to at least one other of the set of available document processing devices.

16. The computer-implemented method for selective rerouting of document processing jobs of claim 13 wherein the step of recombining page output data to the selected document processing device is in accordance with the unique document identification data.

17. The computer-implemented method for selective rerouting of document processing jobs of claim 13 further comprising the step of selectively storing page output data for selective completion of at least one additional document processing operation.

18. The computer-implemented method for selective rerouting of document processing jobs of claim 17 further comprising the step of selectively deleting stored page output data upon at least one of expiration of a pre-selected time duration and receipt of a delete signal from an associated user.

19. A system for selective rerouting of document processing jobs comprising:
  an input operable for receiving electronic document data representative of a document processing job for an associated document processing device;
  a processor operable for converting received electronic document data into page description data comprised of at least one selected page description language format;
  the processor further operable for assigning unique document identification data to the document processing job;
  the processor further operable for determining a set of available document processing devices available for processing of the document processing job;
  an output operable for communicating a portion of the page description data to each of the set of available document processing devices;
  an input operable for receiving, from an associated user, the unique document identification data corresponding to the document processing job at a selected one of the set of available document processing devices,
  an output operable for communicating a request, inclusive of the unique document identification data, for all portions of the page description data to each of the set of available document processing devices from the selected one of the set of devices responsive to receipt of the unique document identification data;
  an input operable for receiving page output data from each of the set of available document processing devices responsive to the communicated request in accordance with the unique document identification data;
  the processor further operable for recombining, into the page description data, page output data received from each of the set of available document processing devices at the selected document processing device for processing at the selected document processing device after receipt; and
  the processor further operable for processing the recombined page description data at the selected document processing device so as to generate page output data therefrom.

20. The system for selective rerouting of document processing jobs of claim 19 further comprising an input operable for receiving, from an associated user, selection data representative of the selected document processing device.

21. The system for selective rerouting of document processing jobs of claim 19 wherein:

the processor is further operable for detecting at least one inoperative document processing device in the set of available document processing devices; and the processor is further operable for allocating page description data targeted to the at least one inoperative document processing device to at least one other of the set of available document processing devices.

22. The system for selective rerouting of document processing jobs of claim 19 wherein each of the set of available document processing devices includes a processor operable for recombining page output data at the selected document processing device in accordance with the unique document identification data.

23. The system for selective rerouting of document processing jobs of claim 19 further comprising a storage operable for selectively storing page output data for selective completion of at least one additional document processing operation.

24. The system for selective rerouting of document processing jobs of claim 23 wherein the processor is further operable for selectively deleting stored page output data upon at least one of expiration of a pre-selected time duration and receipt of a delete signal from an associated user.

* * * * *